United States Patent
Seo et al.

(10) Patent No.: US 9,385,857 B2
(45) Date of Patent: Jul. 5, 2016

(54) METHOD AND APPARATUS FOR APPLYING CONTROL INFORMATION IN WIRELESS COMMUNICATION SYSTEM

(75) Inventors: Dong Youn Seo, Anyang-si (KR); Min Gyu Kim, Anyang-si (KR); Suck Chel Yang, Anyang-si (KR); Joon Kui Ahn, Anyang-si (KR)

(73) Assignee: LG Electronics Inc., Seoul (KR)

( * ) Notice: Subject to any disclaimer, the term of this patent is extended or adjusted under 35 U.S.C. 154(b) by 168 days.

(21) Appl. No.: 14/115,274

(22) PCT Filed: May 2, 2012

(86) PCT No.: PCT/KR2012/003435
§ 371 (c)(1),
(2), (4) Date: Apr. 28, 2014

(87) PCT Pub. No.: WO2012/150810
PCT Pub. Date: Nov. 8, 2012

(65) Prior Publication Data
US 2014/0233469 A1 Aug. 21, 2014

Related U.S. Application Data

(60) Provisional application No. 61/481,705, filed on May 2, 2011.

(51) Int. Cl.
*H04L 5/14* (2006.01)
*H04L 5/00* (2006.01)
*H04L 1/18* (2006.01)
(Continued)

(52) U.S. Cl.
CPC .............. *H04L 5/14* (2013.01); *H04L 1/1858* (2013.01); *H04L 1/1864* (2013.01); *H04L 5/001* (2013.01); *H04L 5/0019* (2013.01); *H04L 5/0053* (2013.01); *H04L 5/0055* (2013.01); *H04W 72/0406* (2013.01); *H04L 27/2636* (2013.01)

(58) Field of Classification Search
None
See application file for complete search history.

(56) References Cited

U.S. PATENT DOCUMENTS

| 2008/0046793 A1* | 2/2008 | Heo et al. ................. 714/748 |
| 2008/0095109 A1* | 4/2008 | Malladi et al. ............ 370/330 |
| 2009/0097457 A1* | 4/2009 | Papasakellariou et al. ... 370/336 |

(Continued)

FOREIGN PATENT DOCUMENTS

WO   WO 2010008228 A2 *  1/2010  ............... H04B 7/26

OTHER PUBLICATIONS

Panasonic, ACK/NACK Repetition and Implicit Resource Allocation for PUCCH, 3GPP TSG RAN WG1 Meeting #53, R1-081796, Kansas City, USA, May 5-9, 2008, pp. 1-2.*

(Continued)

*Primary Examiner* — Benjamin Lamont
(74) *Attorney, Agent, or Firm* — Dentons US LLP

(57) ABSTRACT

Provided are a method and an apparatus for applying control information in a wireless communication system. The method includes the steps of: receiving a setting for ACK/NACK(acknowledgement/not-acknowledgement) repetition from a base station; receiving control information to be applied at a particular time point from the base station; transmitting ACK/NACK for the control information; and performing an operation according to the control information at the particular time point when the transmitted ACK/NACK is ACK, wherein the operation at the particular time point is applied to a subframe which is determined according to the setting for ACK/NACK repetition.

14 Claims, 13 Drawing Sheets

(51) Int. Cl.
*H04W 72/04* (2009.01)
*H04L 27/26* (2006.01)

(56) References Cited

U.S. PATENT DOCUMENTS

| | | | |
|---|---|---|---|
| 2009/0207793 A1* | 8/2009 | Shen et al. | 370/329 |
| 2010/0097978 A1* | 4/2010 | Palanki et al. | 370/315 |
| 2010/0153804 A1 | 6/2010 | Cai et al. | |
| 2010/0331037 A1* | 12/2010 | Jen | 455/522 |
| 2011/0269490 A1* | 11/2011 | Earnshaw et al. | 455/509 |
| 2015/0055533 A1* | 2/2015 | Jung et al. | 370/311 |

OTHER PUBLICATIONS

3GPP TSG-RAN WG2 #64bis, R2-090417, "The collision between measurement gap and HARQ feedback in ACK/NACK repetition", CATT, Jan. 12-16, 2009.

3GPP TSG RAN WG1 Meeting #64, R1-110845, "Discussion on ACK/NACK Repetition in Rel-10", LG Electronics, Feb. 21-25, 2011 See pp. 1-2.

* cited by examiner

METHOD AND APPARATUS FOR APPLYING CONTROL INFORMATION IN WIRELESS COMMUNICATION SYSTEM

This application is a 35 USC §371 National Stage entry of International Application No. PCT/KR2012/003435 filed on May 2, 2012 and claims priority to U.S. Provisional Application Nos. 61/481,705 filed on May. 2, 2011, each of which is hereby incorporated by reference in its entirety.

BACKGROUND OF THE INVENTION

1. Field of the Invention

The present invention relates to wireless communication, and more specifically, to a method and apparatus for applying control information in a wireless communication system.

2. Related Art

Recently, carrier aggregation systems draw attention. Carrier aggregation systems mean systems that configure a broadband by aggregating one or more component carriers (CCs) each having a smaller bandwidth than that of the target broadband when supporting a broadband in a wireless communication system. In the carrier aggregation system, the term "serving cell" may also be used instead of the "component carrier." Here, a serving cell consists of a downlink component carrier (DL CC) and an uplink component carrier (UL CC) or consists only of a DL CC. In other words, the carrier aggregation system is a system in which a plurality of serving cells is configured for a single terminal.

In the carrier aggregation system, a base station, after configuring a plurality of serving cells for a terminal, may activate or deactivate some of the serving cells as necessary. The terminal receives an activation/deactivation signal for the serving cells, and in response, transmits an ACK/NACK (acknowledgement/non-acknowledgement) signal that is a signal for acknowledging the signal reception. The base station should receive the ACK/NACK signal from the terminal so as to be able to be aware of whether the terminal has exactly decoded the activation/deactivation signal for the serving cells. If receiving an ACK from the terminal, the base station activates the serving cells a predetermined time after receiving the ACK.

That is, in the wireless communication system, the base station may transmit control information that applies from a specific time to the terminal, and the terminal may perform a necessary operation from the specific time using the control information. In this process, the terminal may need to inform the base station through an ACK/NACK (acknowledgement/non-acknowledgement) that the terminal has received the control information and has correctly decoded it. Upon receiving an ACK, the base station may perform an operation by the control information from the specific time, and when receiving an NACK, the base station may resend the control information.

Meanwhile, as a method of transmitting an ACK/NACK, there is ACK/NACK repetition. The ACK/NACK repetition means that an ACK/NACK responding to reception of the same data, rather than being sent only in a single subframe, is repeatedly transmitted a predetermined number of times in a plurality of subframes. The ACK/NACK repetition may also be applicable to an ACK/NACK for control information that applies from a specific time.

However, in the conventional wireless communication systems, when the ACK/NACK repetition applies, the time when the base station is considered to have received an ACK/NACK is ambiguous so that the time when an operation applies under specific control information is unclear. As an example, in the above-described carrier aggregation system, the time when the activation/deactivation information of a serving cell applies is unclear. In general, when the ACK/NACK repetition is used in control information transmission that applies from a specific time, transmission of an ACK/NACK in response thereto, and a process requiring determination of the specific time, the specific time when the control information applies may be vague.

SUMMARY OF THE INVENTION

An object of the present invention is to provide a method and apparatus for applying control information in a wireless communication system.

In an aspect, there is provided a method of applying control information of a terminal in a wireless communication system. The method comprises receiving a setting as to whether ACK/NACK (acknowledgement/not-acknowledgement) repetition is performed from a base station; receiving control information that is applied from a specific time from the base station; transmitting an ACK/NACK for the control information; and in a case where the transmitted ACK/NACK is an ACK, performing an operation according to the control information from the specific time, wherein the operation performed from the specific time is determined depending on whether the ACK/NACK repetition is set.

The control information may be included in a higher layer signal received through a PDSCH (physical downlink shared channel).

In a case where the ACK/NACK repetition is set, the ACK/NACK for the control information may be repeatedly transmitted in subframes whose number is indicated by a parameter ($N_{ANRep}$) configured by a higher layer signal by the parameter.

When a subframe in which the control information is received is a subframe n, and a maximum value of values that may be possessed by the parameter ($N_{ANRep}$) is max(NANRep,configurable), a subframe in which the operation according to the control information is performed may begin from a subframe (n+max(NANRep,configurable)+7).

A serving cell in which the terminal operates may be a serving cell that operates in FDD (frequency division duplex).

A serving cell in which the terminal operates may be a serving cell that operates in TDD (time division duplex).

In a case where the ACK/NACK repetition is not set, when a downlink subframe for receiving the control information is a subframe n, and an uplink subframe in which the ACK/NACK for the control information is transmitted is a subframe n+m(n), a subframe in which the operation according to the control information is performed may begin from a subframe n+m(n)+4.

In a case where the ACK/NACK repetition is set so that the ACK/NACK for the control information is repeatedly transmitted in uplink subframes whose number is the same as a parameter $N_{ANRep}$ configured by a higher layer signal, when a subframe for receiving the control information is a subframe n, a subframe in which the operation according to the control information is a subframe n+a+4, wherein a may be a maximum value of values given as the number of subframes from the subframe n to $N_{ANRep}$ uplink subframes including the subframe n+m(n) in a UL-DL configuration of a serving cell in which the terminal operates.

In a case where the ACK/NACK repetition is set so that the ACK/NACK for the control information is repeatedly transmitted in $N_{ANRep}$ uplink subframes, where $N_{ANRep}$ is a parameter configured by a higher layer signal, if a subframe for receiving the control information is a subframe n, a subframe in which an operation according to the control information is performed is given as a subframe n+a+4, wherein a may be a maximum value of values given as the number of subframes from the subframe n to $N_{ANRep}$ uplink subframes including the subframe n+m(n) in a UL-DL configuration of a serving cell in which the terminal operates.

In another aspect, there is provided a terminal comprising an RF (Radio Frequency) unit transmitting and receiving a radio signal; and a processor connected to the RF unit, wherein the processor receives a setting as to whether to perform ACK/NACK (acknowledgement/not-acknowledgement) repetition from a base station, receives control information that is applied from a specific time from the base station, transmits an ACK/NACK for the control information, and in a case where the transmitted ACK/NACK is an ACK, performs an operation according to the control information from the specific time, wherein the operation performed from the specific time applies from a subframe determined depending on whether the ACK/NACK repetition is set.

In a wireless communication system, no error occurs in a time when control information applies. In particular, even when the ACK/NACK repetition for control information is used, no error takes place in a time when control information applies between a base station and a terminal.

DESCRIPTION OF EXEMPLARY EMBODIMENTS

The technologies to be described below may be used for various wireless communication systems, such as CDMA (Code Division Multiple Access), FDMA(Frequency Division Multiple Access), TDMA(Time Division Multiple Access), OFDMA(Orthogonal Frequency Division Multiple Access), SC-FDMA (Single Carrier Frequency Division Multiple Access). CDMA may be implemented in the radio technology such as UTRA(Universal Terrestrial Radio Access) or CDMA2000. TDMA may be implemented in the radio technology such as GSM(Global System for Mobile communications)/GPRS(General Packet Radio Service)/EDGE(Enhanced Data Rates for GSM Evolution). OFDMA may be implemented in the radio technology such as IEEE 802.11(Wi-Fi), IEEE 802.16(WiMAX), IEEE 802-20, E-UTRA(Evolved UTRA). IEEE 802.16m is the evolution of IEEE 802.16e and provides backward compatibility with a system based on IEEE 802.16e. UTRA is part of UMTS (Universal Mobile Telecommunications System). 3GPP(3rd Generation Partnership Project) LTE(Long Term Evolution) is part of E-UMTS (Evolved UMTS) using E-UTRA (Evolved-UMTS Terrestrial Radio Access) and adopts OFDMA for downlink and SC-FDMA for uplink. LTE-A (Advanced) is the evolution of 3GPP LTE. For clarity of description, LTE-A is primarily described, but the present invention is not limited thereto.

A wireless communication system includes at least one base station (BS). Each base station provides a communication service in a specific geographical area. The base station refers to a fixed station that communicates with a terminal and may also be referred to as an eNB (evolved-NodeB), a BTS (Base Transceiver System), or an access point.

The terminal (User Equipment, UE) is stationary or mobile and may be referred to as an MS(Mobile Station), an MT(Mobile Terminal), a UT(User Terminal), an SS(Subscriber Station), a wireless device, a PDA(Personal Digital Assistant), a wireless modem, or a handheld device. The downlink refers to communication from the base station to the terminal, and the uplink refers to communication from the terminal to the base station. The wireless communication system is generally divided into an FDD (frequency division duplex) type and a TDD (time division duplex) type. In FDD, uplink transmission and downlink transmission are performed in different frequency bands, respectively. In TDD, uplink transmission and downlink transmission are performed at different times, respectively, in the same frequency band.

Figure 1:
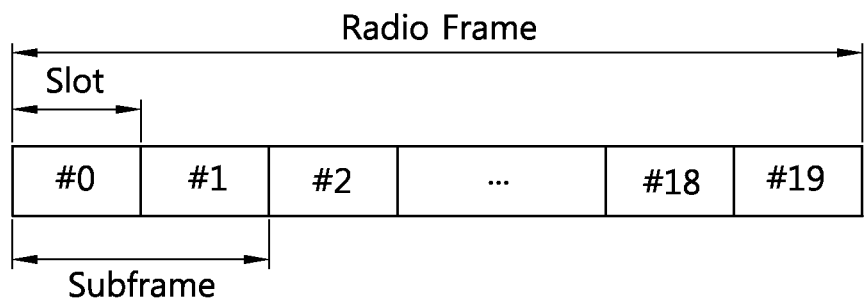
FIG. 1 shows a structure of an FDD radio frame in 3GPP LTE.

FIG. 1 shows a structure of an FDD radio frame in 3GPP LTE.

Referring to FIG. 1, the FDD radio frame consists of 10 subframes, and each subframe consists of two slots. In the FDD radio frame, the slots are numbered with #0 to #19. The time taken for one subframe to be transmitted is a TTI (Transmission Time Interval). The TTI may be a scheduling basis for transmission of data. For example, the length of one FDD radio frame may be 10 ms, the length of one subframe may be 1 ms, and the length of one slot may be 0.5 ms.

Figure 2:
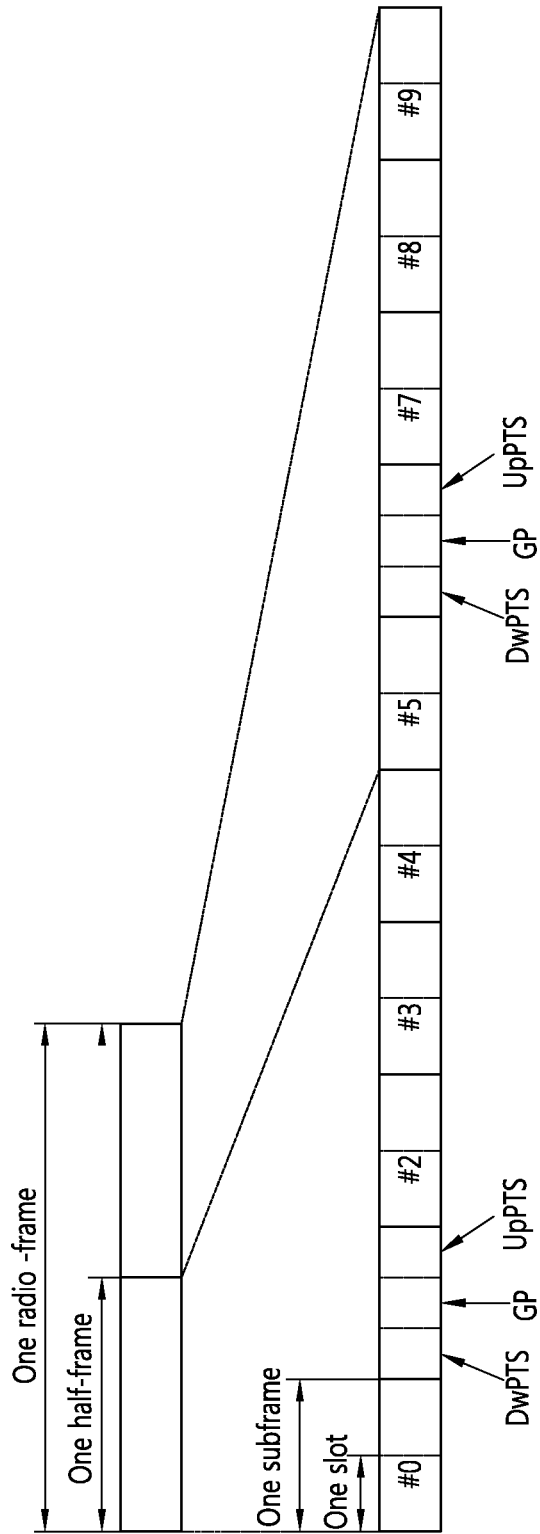
FIG. 2 shows a structure of a TDD radio frame.

FIG. 2 shows a structure of a TDD radio frame.

Referring to FIG. 2, the TDD radio frame (hereinafter, TDD frame) used in TDD includes 10 subframes marked with indexes 0 to 9. One subframe includes two consecutive slots. For example, the length of one subframe may be 1 ms, and the length of one slot may be 0.5 ms.

The subframe having index #1 and index #6 may be a special subframe and the special subframe includes DwPTS (Downlink Pilot Time Slot: DwPTS), GP(Guard Period) and UpPTS(Uplink Pilot Time Slot). DwPTS is used for initial cell discovery, sync or channel estimation in the terminal. UpPTS is used for channel estimation in the base station and syncing uplink transmission of the terminal. GP is a period for eliminating interference that occurs on uplink due to a multipath delay of a downlink signal between uplink and downlink.

In the TDD frame, a downlink (DL) subframe and an uplink (UL) subframe co-exist. Table 1 shows examples of UL-DL configurations of the TDD frame.

TABLE 1

| Uplink-downlink configuration | Downlink-to-Uplink Switch-point periodicity | Subframe number n | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms  | D | S | U | U | U | D | S | U | U | U |
| 1 | 5 ms  | D | S | U | U | D | D | S | U | U | D |
| 2 | 5 ms  | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms  | D | S | U | U | U | D | S | U | U | D |

In Table 1 above, 'D,' 'U,' and 'S,' respectively, refer to a downlink subframe, an uplink subframe, and a special subframe. When receiving a UL-DL configuration from the base station, the terminal may be aware of which subframe in the TDD frame is the DL subframe, the UL subframe, or the special subframe according to the UL-DL configuration.

Figure 3:
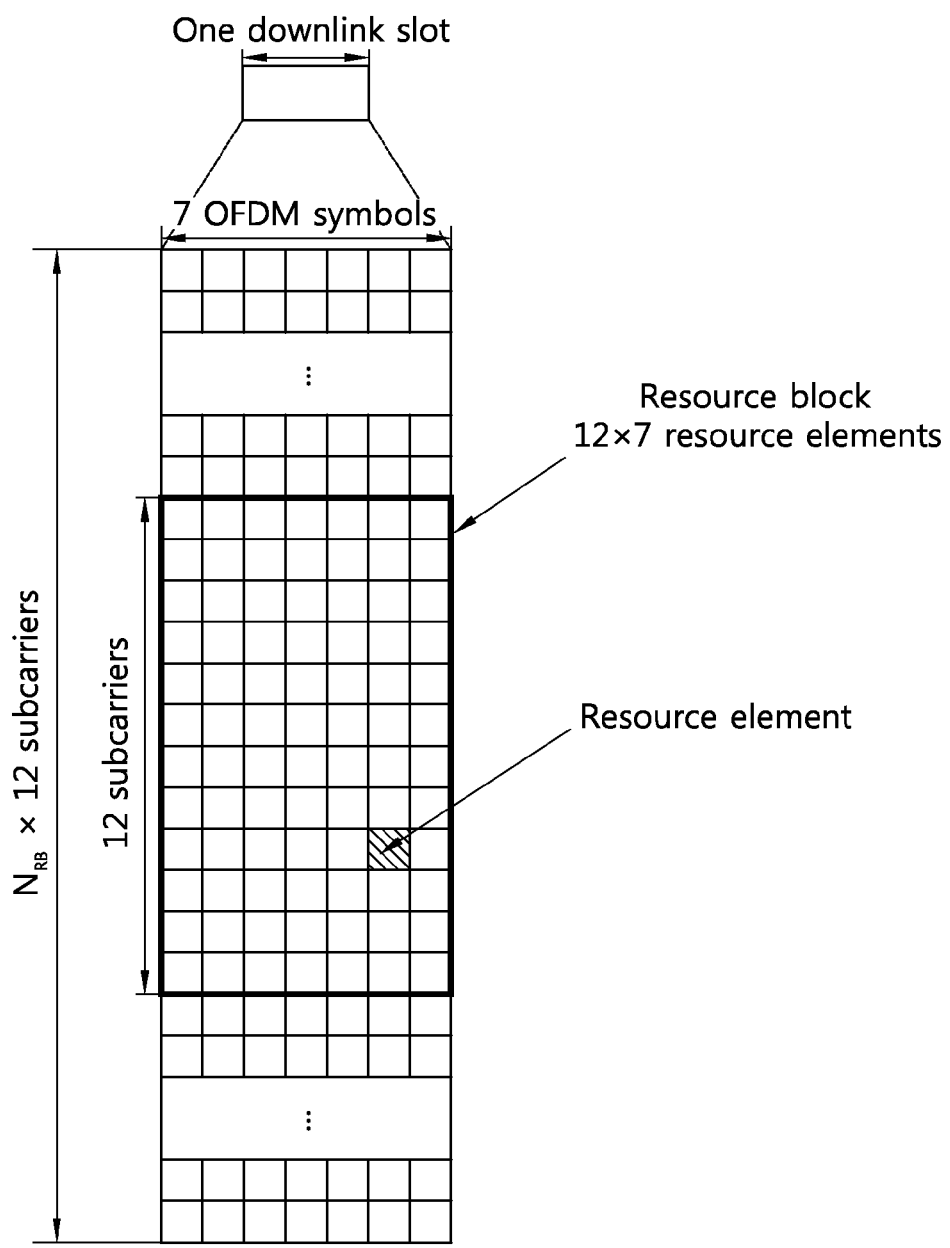
FIG. 3 shows an example of a resource grid for one downlink slot.

FIG. 3 shows an example of a resource grid for one downlink slot.

The downlink slot includes a plurality of OFDM symbols in the time domain and includes $N_{RB}$ resource blocks (RBs) in the frequency domain. The number, $N_{RB}$, of resource blocks included in the downlink slot is dependent upon the downlink transmission bandwidth that is configured in the cell. For example, in the LTE system, $N_{RB}$ may be one of 6 to 110. One resource block includes a plurality of sub-carriers in the frequency domain. The structure of the uplink slot may be the same as the structure of the downlink slot.

Each element on the resource grid is referred to as a resource element. The resource element on the resource grid may be identified by an index pair (k,l) in the slot. Here, k(k=0, . . . , $N_{RB}$×12-1) is a sub-carrier index in the frequency domain, and l(l=0, . . . , 6) is an OFDM symbol index in the time domain.

Here, although one resource block, by way of example, includes a 7×12 resource element consisting of seven OFDM symbols in the time domain and twelve sub-carriers in the frequency domain, the number of OFDM symbols and the number of sub-carriers in the resource block are not limited thereto. The number of OFDM symbols and the number of sub-carriers may vary depending on the length of CP or frequency spacing. For example, in the case of normal CP, the number of OFDM symbols is 7, and in the case of extended CP, the number of OFDM symbols is 6. The number of sub-carriers in one OFDM symbol may be picked up among 128, 256, 512, 1024, 1536 and 2048.

Figure 4:
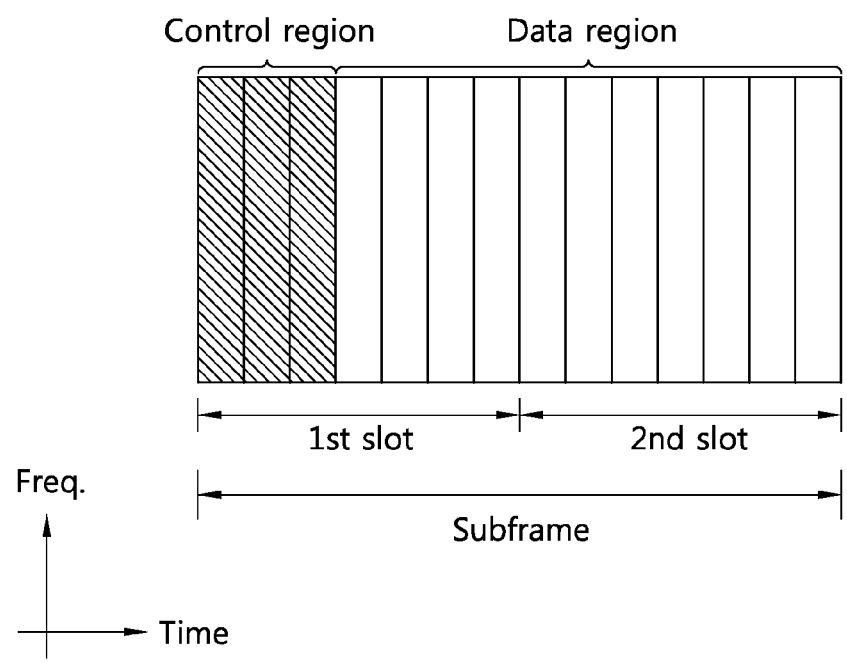
FIG. 4 shows a structure of a downlink subframe.

FIG. 4 shows a structure of a downlink subframe.

The downlink subframe includes two slots in the time domain and each slot includes seven OFDM symbols in the normal CP. The first maximum three OFDM symbols (maximum four OFDM symbols in the bandwidth of 1.4 MHz) of the first slot in the subframe are a control region where control channels are allocated, and the remaining OFDM symbols are a data region where a PDSCH (Physical Downlink Shared Channel) is allocated.

The PDCCH (physical downlink control channel) may carry resource allocation and transmission format of a DL-SCH (Downlink-Shared Channel), resource allocation information of a UL-SCH (Uplink Shared Channel), paging information on a PCH (paging channel), system information on the DL-SCH, resource allocation of a higher-layer control message such as a random access response transmitted on the PDSCH, a set of transmission power control commands for each terminal in any terminal group, and activation of VoIP (Voice over Internet Protocol). A plurality of PDCCHs may be transmitted in the control region, and the terminal may monitor a plurality of PDCCHs. The PDCCH is transmitted on the aggregation of one or a few consecutive CCEs (Control Channel Elements). The CCE is a logical allocation basis used for providing a coding rate according to the state of a radio channel to the PDCCH. The CCE corresponds to a plurality of resource element groups. Depending on the correlation between the number of CCEs and coding rate provided by the CCEs, the format of the PDCCH and the possible number of bits of the PDCCH are determined.

The base station determines the format of the PDCCH according to downlink control information (DCI) to be sent to the terminal and adds a CRC (Cyclic Redundancy Check) to the control information. The CRC is masked with a unique identifier (RNTI; Radio Network Temporary Identifier) depending on the purpose or owner of the PDCCH. In the case of the PDCCH for a specific terminal, the unique identifier of the terminal, for example, C-RNTI (Cell-RNTI), may be masked to the CRC. Or, in the case of the PDCCH for a paging message, a paging indication identifier, for example, P-RNTI (Paging-RNTI), may be masked to the CRC. In the case of the PDCCH for system information (SIB; System Information Block), a system information identifier, an SI-RNTI (System Information-RNTI) may be masked to the CRC. In order to indicate a random access response that is a response to transmission of a random access preamble of the terminal, an RA-RNTI (Random Access-RNTI) may be masked to the CRC.

Figure 5:
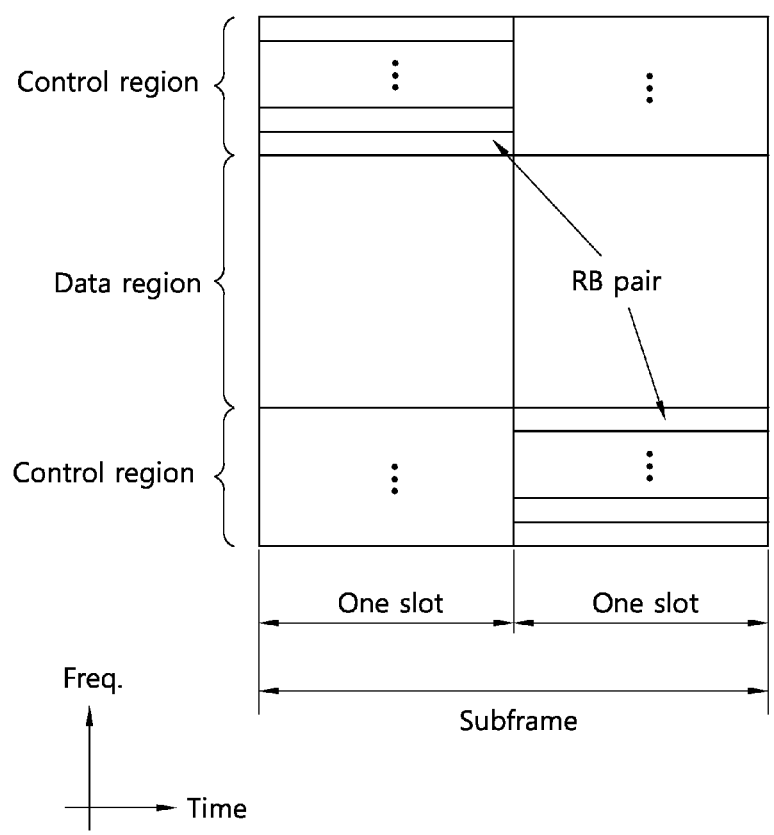
FIG. 5 shows a structure of an uplink subframe.

FIG. 5 shows a structure of an uplink subframe.

The uplink subframe may be separated into a control region and a data region in the frequency domain. The control region is allocated with a PUCCH (Physical Uplink Control Channel) for transmitting uplink control information. The data region is allocated with a PUSCH (Physical Uplink Shared Channel) for transmitting data. When indicated by a higher layer, the terminal may support simultaneous transmission of the PUSCH and the PUCCH.

The PUSCH is mapped with a UL-SCH (Uplink Shared Channel) that is a transport channel. Uplink data transmitted on the PUSCH may be a transport block that is a data block for the UL-SCH transmitted during a TTI. The transport block may be user information. Or, the uplink data may be multiplexed data. The multiplexed data may be one obtained by multiplexing a transport block for the UL-SCH and the uplink control information. For example, the uplink control information multiplexed with data may include an ACK/NACK (acknowledgement/not-acknowledgement), a CQI(channel quality indicator), a PMI(Precoding Matrix Indicator), and an RI(Rank Indicator). The CQI provides information on a link adaptive parameter that may be supported by the terminal for a given time and represents channel quality. The PMI provides information on a precoding matrix in precoding of a codebook base. The RI is information on the number of layers recommended by the terminal. That is, the RI denotes the number of streams used for spatial multiplexing. The information indicating a channel state, such as the CQI, PMI, and RI is collectively referred to as channel state information (CSI). Hereinafter, the uplink control information includes an ACK/NACK and CSI. Or, the uplink data may consist only of uplink control information.

The PUCCH is allocated in an RB pair in the subframe. The RBs included in the RB pair take up different sub-carriers in the first and second slots, respectively. The RB pair has the same resource block index m. m is a location index indicating the location of a logical frequency region of the resource block pair allocated to the PUCCH in the subframe.

Figure 6:
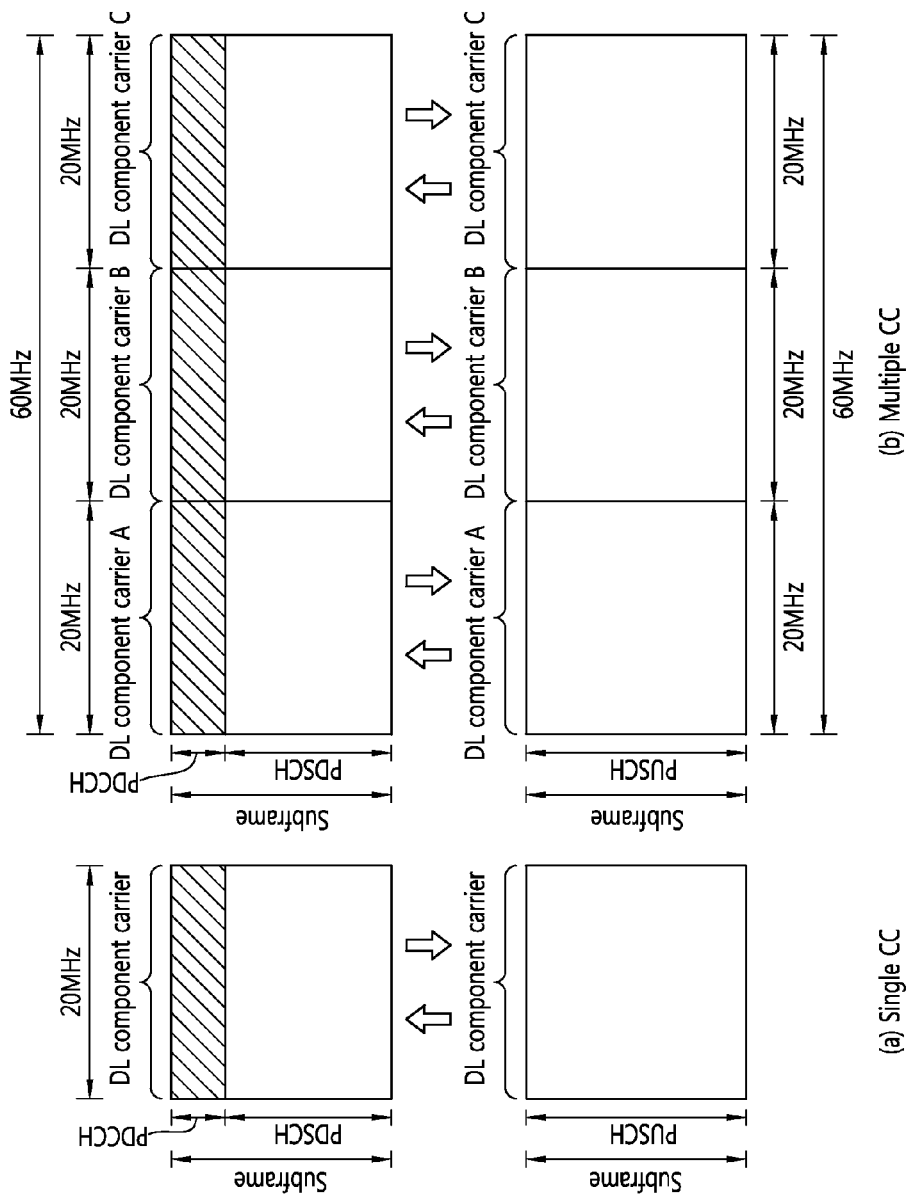
FIG. 6 shows a comparative example between an existing single carrier system and a carrier aggregation system.

FIG. 6 shows a comparative example between an existing single carrier system and a carrier aggregation system.

Referring to FIG. 6, in the single carrier system, only one carrier is supported for a terminal on either uplink or downlink. Only one carrier is allocated to the terminal even though the carrier may have various bandwidths. In contrast, in the carrier aggregation system supporting carrier aggregation (CA), a plurality of component carriers (DL CC A to C, UL CC A to C) may be allocated to the terminal. The component carriers (CCs) mean carriers used in the carrier aggregation system and may be simply referred to as carriers. For example, three 20 MHz component carriers may be allocated to the terminal to assign a 60 MHz bandwidth to the terminal.

When aggregating one or more component carriers, the component carriers may use, as is, the bandwidth used in the existing system in order to provide backward compatibility. For example, the 3GPP LTE system supports bandwidths of 1.4 MHz, 3 MHz, 5 MHz, 10 MHz, 15 MHz, and 20 MHz and the 3GPP LTE-A system may configure a broadband of 20 MHz or more using only the bandwidths of the 3GPP LTE system. Or, without using the bandwidths of the existing system, a new bandwidth may be defined to configure a broadband.

In the carrier aggregation system, the term "cell" may be sometimes used. The cell may refer to a downlink frequency resource and an uplink frequency resource. Or, the cell may mean a combination of a downlink frequency resource and an optional uplink frequency resource. Or, in case carrier aggregation is not considered in general, one cell may have an uplink frequency resource and a downlink frequency resource that are present always in pair.

In order for data transmission and reception to be achieved through a specific cell, the terminal need first complete a configuration for the specific cell. Here, the "configuration" means a status in which system information necessary for data transmission and reception for a corresponding cell has been completely received. For example, the configuration may include the overall process of receiving common physical layer parameters necessary for data transmission and reception, MAC (media access control) layer parameters, or parameters necessary for a specific operation in an RRC layer. A cell, when its configuration has been complete, is in the state where, only when receiving information indicating that packet data may be transmitted, transmission and reception of packets may be immediately conducted.

The configuration-completed cell may be left in an activation state or deactivation state. Here, the activation refers to data transmission or reception being conducted or being ready. The terminal may monitor or receive a control channel (PDCCH) and a data channel (PDSCH) of the activated cell in order to identify resources (which may be frequency or time) allocated thereto.

The deactivation refers to traffic data being impossible to transmit or receive while measurement or transmission/reception of minimum information is possible. The terminal may receive system information (SI) necessary for packet reception from a deactivated cell. On the contrary, the terminal does not monitor or receive a control channel (PDCCH) and data channel (PDSCH) to identify resources (which may be frequency or time) allocated thereto.

Cells may be classified into primary cells, secondary cells, and serving cells.

When carrier aggregation is configured, the terminal has only one RRC connection with a network. In the process of RRC connection establishment/reestablishment/handover, one cell provides NAS (non-access stratum) mobility information and a security input. Such cell is referred to as a primary cell. In other words, the primary cell means a cell in which the terminal performs an initial connection establishment procedure or connection reestablishment procedure with the base station or a cell indicated as a primary cell during the process of handover.

The secondary cell means a cell that is configured to provide additional radio resources after an RRC connection has been established through the primary cell.

The serving cell is configured as the primary cell in the case of terminal with no carrier aggregation configured or terminal that cannot provide carrier aggregation. In case carrier aggregation is configured, the term "serving cell" refers to a cell configured for the terminal and a plurality of serving cells may be configured. The plurality of serving cells may consist of the primary cell and one or more of all the secondary cells.

The PCC (primary component carrier) means a component carrier (CC) corresponding to the primary cell. The PCC is, among others, a CC through which the terminal forms a link (connection or RRC connection) with the base station at early stage. The PCC is a special CC that is in charge of link (connection or RRC connection) for signaling regarding multiple CCs and that manages terminal context (UE context) that is link information associated with the terminal. Further, the PCC remains always in the activation state when linked with the terminal and thus being in the RRC connected mode. The downlink component carrier corresponding to the primary cell is referred to as downlink primary component carrier (DL PCC) and the uplink component carrier corresponding to the primary cell is referred to as uplink primary component carrier (UL PCC).

The SCC (secondary component carrier) means a CC corresponding to the secondary cell. That is, the SCC is a CC other than the PCC, which is allocated to the terminal. The SCC is an extended carrier for the terminal to allocate additional resources besides the PCC and may be left in the activation state or deactivation state. The downlink component carrier corresponding to the secondary cell is referred to as a downlink secondary component carrier (DL secondary CC, DL SCC) and the uplink component carrier corresponding to the secondary cell is referred to as uplink secondary component carrier (UL SCC).

The primary cell and the secondary cell have the following characteristics.

First, the primary cell is used for transmission of a PUCCH. Second, the primary cell always remains activated while the secondary cell is a carrier that is activated/deactivated depending on specific conditions. Third, when the primary cell experiences a radio link failure (hereinafter, "RLF"), RRC reconnection is triggered. Fourth, the primary cell may be varied by a handover procedure that comes with a security key change procedure or RACH (random access channel) procedure. Fifth, the NAS (non-access stratum) information is received through the primary cell. Sixth, in the FDD system, the primary cells are always present in pairs of DL PCCs and UL PCCs. Seventh, a different component carrier (CC) may be set as the primary cell for each terminal. Eighth, the primary cell may be exchanged only through handover, cell selection/cell reselection procedures. In adding a new secondary cell, RRC signaling may be used for transmitting system information of the secondary cell.

In configuring a serving cell with component carriers, a downlink component carrier may configure one serving cell or a downlink component carrier is connection-established with an uplink component carrier to thereby configure one serving cell. However, a single uplink component carrier cannot configure a serving cell.

Activation/deactivation of a component carrier is equivalent in concept to activation/deactivation of a serving cell. For example, assuming that serving cell 1 consists of DL CC1, activation of serving cell 1 means activation of DL CC 1. If serving cell 2 consists of DL CC2 and UL CC2 that are connection-configured with each other, activation of serving cell 2 means activation of DL CC 2 and UL CC 2. From this point of view, each component carrier may correspond to a serving cell.

The number of component carriers aggregated between uplink and downlink may vary. When the number of downlink CCs is the same as the number of uplink CCs is referred to as "symmetric aggregation," and when the number of downlink CCs is different from the number of uplink CCs is referred to as "asymmetric aggregation." The size (i.e., bandwidth) of CCs may vary. For example, when five CCs are used to configure a 70 MHz band, the configuration may be as follows: 5 MHz CC(carrier #0)+20 MHz CC(carrier #1)+20 MHz CC(carrier #2)+20 MHz CC(carrier #3)+5 MHz CC(carrier #4).

As described above, the carrier aggregation system, unlike the single carrier system, may support a plurality of component carriers (CCs), i.e., a plurality of serving cells.

Figure 7:
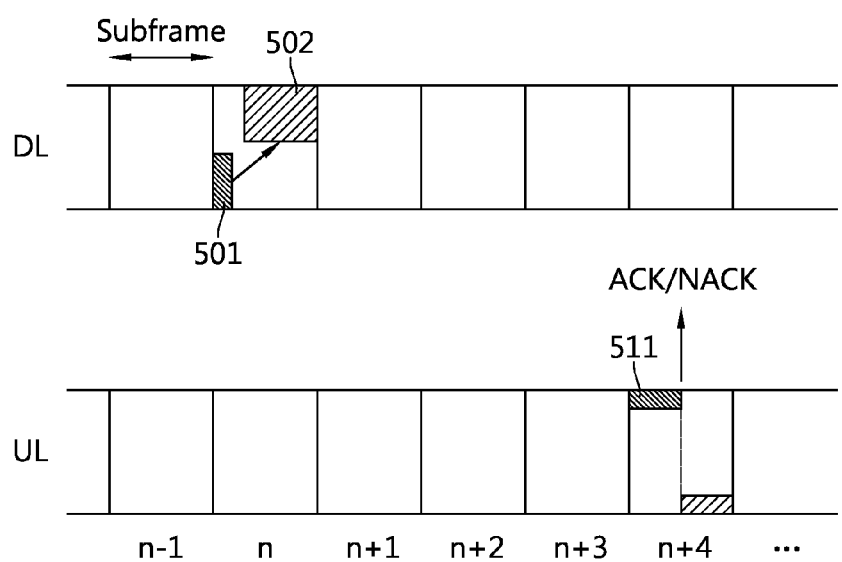
FIG. 7 shows an example of performing a DL HARQ (hybrid automatic repeat request) in FDD.

FIG. 7 shows an example of performing a DL HARQ (hybrid automatic repeat request) in FDD. That is, FIG. 7 illustrates timings of an LTE DL HARQ process.

The terminal monitors a PDCCH and receives DL resource allocation (or DL grant) on PDCCH 501 in the nth DL subframe. The terminal receives a DL transport block through a PDSCH 502 indicated by the DL resource allocation.

The terminal transmits an ACK/NACK signal for the DL transport block on a PUCCH 511 in the n+4th UL subframe. The ACK/NACK signal may be reception acknowledgement information for the DL transport block.

If the DL transport block is successfully decoded, the ACK/NACK signal is the ACK signal, and if decoding the DL transport block fails, the ACK/NACK signal is the NACK signal.

The base station may resend the DL transport block or send a new DL transport block in the subframe that is positioned four subframes after the subframe in which the ACK/NACK signal has been received. For example, when receiving the NACK signal, the base station may perform re-transmission of the DL transport block until the ACK signal is received or the re-transmission reaches its maximum number of times.

A method of transmitting an ACK/NACK in a carrier aggregation system is now described.

A PUCCH supports multiple formats. According to a modulation scheme dependent upon a PUCCH format, a PUCCH having a different number of bits per subframe may be used. The following Table 2 shows examples of modulation schemes and the numbers of bits per subframe according to PUCCH formats:

TABLE 2

| PUCCH format | modulation scheme | number of bits per subframe |
| --- | --- | --- |
| 1 | N/A | N/A |
| 1a | BPSK | 1 |
| 1b | QPSK | 2 |
| 2 | QPSK | 20 |
| 2a | QPSK + BPSK | 21 |
| 2b | QPSK + QPSK | 22 |

PUCCH format 1 is used for transmission of an SR (Scheduling Request), PUCCH formats 1a/1b are used for transmission of an ACK/NACK signal, PUCCH format 2 is used for transmission of CQI, and PUCCH formats 2a/2b are used for transmission of simultaneous transmission of an ACK/NACK signal. When only the ACK/NACK signal is transmitted in the subframe, PUCCH formats 1a/1b are used, and when the SR alone is transmitted, PUCCH format 1 is used. When the SR and ACK/NACK signal are simultaneously transmitted, PUCCH format 1 is used, and the ACK/NACK signal is modulated and transmitted in the resource allocated to the SR.

All of the PUCCH formats use a cyclic shift (CS) of a sequence in each OFDM symbol. The cyclic shifted sequence is generated by cyclic-shifting a base sequence by a specific CS (cyclic shift) amount. The specific CS amount is indicated by a cyclic shift (CS) index.

The base sequence, $r_u(n)$, is defined by way of example as follows:

$$r_u(n)=e^{jb(n)\pi/4} \qquad \text{[Equation 1]}$$

Here, u is a root index, and n is an element index satisfying: $0=n=N-1$, where N is the length of the base sequence. b(n) is defined in Ch. 5.5, 3GPP TS 36.211 V8.7.0.

The length of a sequence is equal to the number of elements included in the sequence. u is a cell ID (identifier) and may be determined by a slot number in a radio frame. When the base sequence is mapped to one resource block in the frequency domain, since one resource block includes 12 sub-carriers, the length N of the base sequence is 12. According to a different root index, a different base sequence is defined.

The base sequence r(n) may be cyclic-shifted as in Equation2, thus generating a cyclic-shifted sequence $r(n, I_{cs})$:

$$r(n, I_{cs}) = r(n) \cdot \exp\left(\frac{j2\pi I_{cs} n}{N}\right), 0 \le I_{cs} \le N-1 \qquad \text{[Equation 2]}$$

Here, $I_{cs}$ is a cyclic shift index having a CS amount $(0 \le I_{cs} \le N-1)$.

The available cyclic shift of the base sequence refers to a cyclic shift index that may be derived from the base sequence according to a CS interval. For example, in case the length of the base sequence is 12 and the CS interval is 1, the total number of available cyclic shift indexes of the base sequence is 12. Or, if the length of the base sequence is 12 and the CS interval is 2, the total number of available cyclic shift indexes of the base sequence 6.

Figure 8:
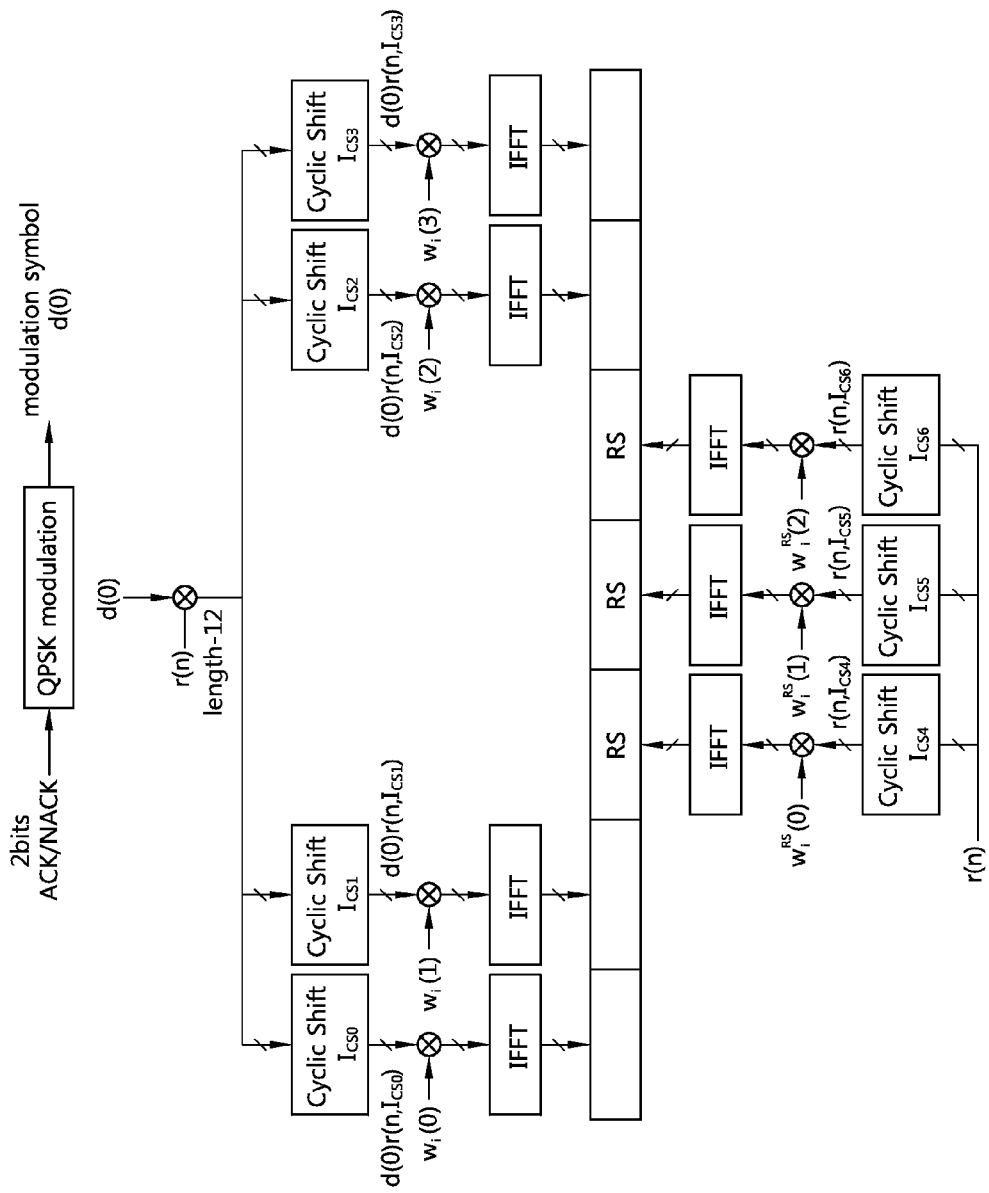
FIG. 8 shows channel structures of PUCCH formats 1a/1b in a normal CP.

FIG. 8 shows channel structures of PUCCH formats 1a/1b in a normal CP.

One slot includes seven OFDM symbols, among which three OFDM symbols RS (reference signal) OFDM symbols for a reference signal and four OFDM symbols are data OFDM symbols for an ACK/NACK signal.

In PUCCH format 1b, an encoded two-bit ACK/NACK signal is QPSK (Quadrature Phase Shift Keying) modulated to generate a modulated symbol d(0). In PUCCH format 1a, an encoded one-bit ACK/NACK signal is BPSK modulated to generate a modulated symbol d(0).

The cyclic shift index $I_{cs}$ may vary depending on a slot number $(n_s)$ in a radio frame and/or a symbol index (I) in a slot.

Since in a normal CP, one slot has four data OFDM symbols for transmission of an ACK/NACK signal, the respective cyclic shift indexes corresponding to the data OFDM symbols are $I_{cs0}$, $T_{cs1}$, $I_{cs2}$, and $I_{cs3}$, respectively.

The modulated symbol d(0) is spread to a cyclic-shifted $r(n, I_{cs})$. In a slot, assuming that a one-dimensionally spread sequence corresponding to the (i+1)th OFDM symbol is m(i), $\{m(0), m(1), m(2), m(3)\} = \{d(0)r(n, I_{cs0}), d(0)r(n, I_{cs1}), d(0)r(n, I_{cs2}), d(0)r(n, I_{cs3})\}$ In order to increase the terminal's capability, the one-dimensionally spread sequence may be spread using an orthogonal sequence. An orthogonal sequence $w_i(k)$ (i is a sequence index, $0 \le k \le K-1$) with a spreading factor K=4 uses the following sequences:

TABLE 3

| Index (i) | [$w_i(0)$, $w_i(1)$, $w_i(2)$, $w_i(3)$] |
|---|---|
| 0 | [+1, +1, +1, +1] |
| 1 | [+1, −1, +1, −1] |
| 2 | [+1, −1, −1, +1] |

An orthogonal sequence $w_i(k)$ (i is a sequence index, $0 \le k \le K-1$) with a spreading factor K=3 uses the following sequences:

TABLE 4

| Index (i) | [$w_i(0)$, $w_i(1)$, $w_i(2)$] |
|---|---|
| 0 | [+1, +1, +1] |
| 1 | [+1, $e^{j2\pi/3}$, $e^{j4\pi/3}$] |
| 2 | [+1, $e^{j4\pi/3}$, $e^{j2\pi/3}$] |

Each slot may have a different spreading factor.

Accordingly, given any orthogonal sequence index i, two-dimensionally spread sequences may be represented as follows:

$\{s(0), s(1), s(2), s(3)\} = \{w_i(0)m(0), w_i(1)m(1), w_i(2)m(2), w_i(3)m(3)\}$

The two-dimensionally spread sequences $\{s(0), s(1), s(2), s(3)\}$, after IFFT is performed, are transmitted in their corresponding OFDM symbols. By doing so, an ACK/NACK signal is transmitted on a PUCCH.

Also, the reference signal of PUCCH format 1b, after the base sequence r(n) is cyclic-shifted, is spread to an orthogonal sequence and is transmitted. Assuming that cyclic shift indexes corresponding to three RS OFDM symbols are $I_{cs4}$, $I_{cs5}$, $I_{cs6}$, three cyclic-shifted sequences $r(n, I_{cs4})$, $r(n, I_{cs5})$, and $r(n, I_{cs6})$ may be obtained. These three cyclic-shifted sequences are spread to an orthogonal sequence $w^{RS}_i(k)$, where k=3.

The orthogonal sequence index I, the cyclic shift index $I_{cs}$, and the resource block index m are parameters necessary for configuring a PUCCH and resources used to discern a PUCCH (or terminal). If the number of available cyclic shifts is 12, and the number of available orthogonal sequence indexes is 3, PUCCHs for a total of 36 terminals may be multiplexed to a single resource block.

In 3GPP LTE, for a terminal to obtain three parameters for configuring a PUCCH, a resource index $n^{(1)}_{PUCCH}$ is defined. The resource index is defined as follows: $n^{(1)}_{PUCCH} = n_{CCE} + N^{(1)}_{PUCCH}$. $n_{CCE}$ is the number of the first CCE used for transmission of corresponding DCI (i.e., allocation of a downlink resource used for reception of downlink data corresponding to the ACK/NACK signal), and $N^{(1)}$PUCCH is a parameter that the base station informs to the terminal in a higher layer message.

The time, frequency, and code resources used for transmission of the ACK/NACK signal are referred to as ACK/NACK resources or PUCCH resources. As set forth above, the index (referred to as an ACK/NACK resource index or PUCCH index) of the ACK/NACK resource required for transmitting the ACK/NACK signal on a PUCCH may be represented in at least any one of the orthogonal sequence index I, cyclic shift index $I_{cs}$, resource block index m, and indexes for obtaining the three indexes. The ACK/NACK resource may include at least any one of an orthogonal sequence, a cyclic shift, a resource block, and a combination thereof.

Figure 9:
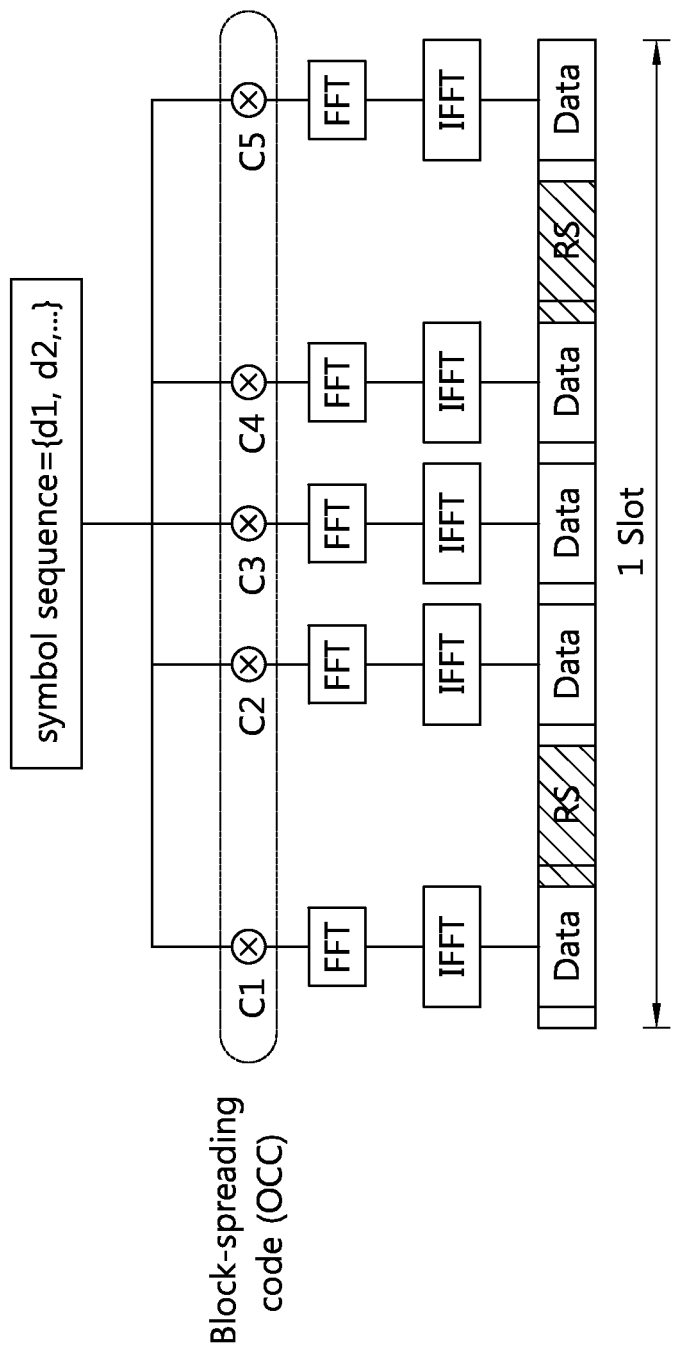
FIG. 9 shows an example of block spreading-based E(enhanced)-PUCCH.

FIG. 9 shows an example of block spreading-based E(enhanced)-PUCCH.

E-PUCCH format is also referred to as PUCCH format 3.

Referring to FIG. 9, the E(enhanced)-PUCCH format is a PUCCH format using a block spreading scheme. The block spreading scheme means a method for multiplexing a modulated symbol sequence obtained by modulating a multi-bit ACK/NACK using a block spreading code. The block spreading scheme may make use of an SC-FDMA scheme. Here, the SC-FDMA scheme means a transmission scheme in which after DFT spreading, an IFFT is performed.

In the E-PUCCH format, a symbol sequence (e.g., an ACK/NACK symbol sequence) is spread by a block spreading code in the time domain and is transmitted. As the block spreading code, an orthogonal cover code (OCC) may be used. Control signals from various terminals may be multiplexed by the block spreading code. In PUCCH format 2, one symbol sequence is transmitted in the time domain, and a cyclic shift of a CAZAC (constant amplitude zero auto-correlation) sequence is used to perform terminal's multiplexing, whereas in the E-PUCCH format, a symbol sequence consisting of one or more symbols is transmitted in the frequency domain of each data symbol and is spread by the block spreading code in the time domain, thereby conducting multiplexing. Although in FIG. 8 one slot uses two RS symbols, the present invention is not limited thereto, and three RS symbols may be used while an orthogonal cover code having 4 as its spreading factor may be used. The RS symbol may be generated from a CAZAC sequence having a specific cyclic shift and may be transmitted in the form obtained by multiplying a plurality of RS symbols in the time domain by a specific orthogonal cover code. In PUCCH format 3, an ACK/NACK or a result of multiplexing an ACK/NACK with CSI may be transmitted.

A method and apparatus for applying control information in a wireless communication system is now described. As an example of applying control information, a time when an activation/deactivation signal applies in a carrier aggregation system is described. However, the present invention is not limited thereto. That is, the present invention may also apply to all of the procedures in which when a base station transmits control information, a terminal, in response, transmits an ACK/NACK and when the base station receives the ACK, the base station and the terminal perform an operation matching the control information. The control information may be a higher layer signal included in a transport block transmitted through a PDSCH, for example, an RRC (radio resource control) message or an MAC (media access control) signal.

Hereinafter, a method of configuring activation by a serving cell in a carrier aggregation system is by way of example described.

In a system supporting carrier aggregation such as an LTE-A system, the base station may configure a plurality of serving cells for the terminal with a higher layer signal such as an RRC. Further, the base station may activate/deactivate some of the plurality of serving cells as necessary.

The terminal transmits CSI only for serving cells that is in the activation state (more specifically, DL CCs of activated serving cells) and does not transmit CSI for deactivated serving cells. Accordingly, in determining whether to transmit CSI, a time when activation/deactivation of serving cells applies is critical.

Hereinafter, assume that a first serving cell and a second serving cell are configured as a primary cell and a secondary cell, respectively, for the terminal. It is also assumed that the second serving cell is in a deactivation state.

Figure 10:
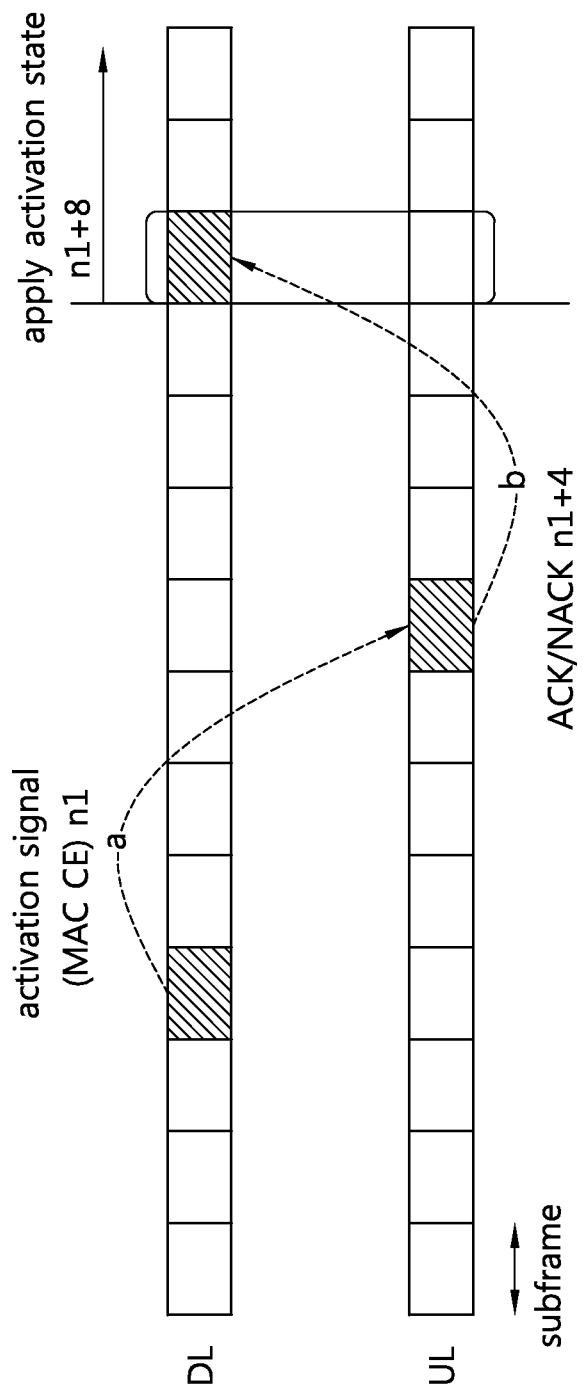
FIG. 10 shows an example of applying activation/deactivation of a serving cell and transmission/reception timings of an activation/deactivation between a base station and a terminal.

FIG. 10 shows an example of applying activation/deactivation of a serving cell and transmission/reception timings of an activation/deactivation between a base station and a terminal.

Referring to FIG. 10, the base station transmits an activation signal for the second serving cell in the subframe n1 of the first serving cell. The activation signal may be transmitted through an MAC (media access control) CE (control element) by L2 signaling in light of a protocol layer. In a system supporting carrier aggregation, the subframe n1 may be included in the DL PCC of the primary cell.

The terminal transmits an ACK/NACK for an activation signal for the second serving cell in the subframe n1+4. The subframe n1+4 may be included in the UL PCC of the primary cell.

The base station, when receiving the ACK from the terminal, activates the second serving cell from the subframe n1+8. Of course, if the base station receives the NACK from the terminal, the base station may resend the activation signal for the second serving cell in the subframe n1+8 or a subsequent subframe.

As shown in FIG. 10, a time when an operation according to specific control information applies, for example, a time when the base station applies an activation/deactivation state for a specific serving cell is a specific time after an activation/deactivation signal for the specific serving cell has been transmitted.

The time from the subframe in which the terminal has received an activation/deactivation signal for the specific serving cell to the subframe in which the terminal transmits an ACK/NACK for the activation/deactivation signal may be referred to as subframe "a" (for example, if the terminal receives the activation/deactivation signal in the subframe n and transmits the ACK/NACK in the subframe n+m, a=m). The time from the subframe in which the terminal has transmitted the ACK/NACK to the subframe in which the base station applies activation/deactivation to the specific serving cell may be referred to as subframe "b" (for example, if the terminal transmits the ACK/NACK in the subframe n+m, and the base station applies the activation/deactivation in the subframe n+m+k, b=k).

In such case, if the time when the terminal receives the activation/deactivation signal for the serving cell is subframe n and the time when the activation/deactivation of the serving cell applies is subframe n+x, x=a+b.

Considering a timing of the existing LTE DL HARQ process, in the case of FDD, a=4 and b=4. However, if ACK/NACK repetition is used for transmission of an ACK/NACK, such values should be changed.

First, the ACK/NACK repetition is described.

The ACK/NACK repetition may be applied or might not be applied by 'ackNackRepetition' that is a terminal-specific (UE specific) parameter configured in a higher layer. The terminal to which the ACK/NACK repetition applies repeats transmission of the ACK/NACK by a repetition factor $N_{ANRep}$. Here, NANRep may be given as one of a plurality of values that may be configured by values provided by the higher layer signal. For example, NANRep may be given as any one of $\{2, 4, 6\}$.

1) for transmission of a PDSCH for which no corresponding PDCCH is detected, the terminal repeatedly transmits the ACK/NACK NANRep times using the PUCCH resource $n^{(1,p)}_{PUCCH}$ provided by the higher layer signal. The PDSCH for which no corresponding PDCCH is detected may be, for example, a PDSCH when the PDSCH is periodically transmitted after downlink semi-persistent scheduling (DL SPS) has been set. In $n^{(1,p)}_{PUCCH}$, p denotes an antenna port.

2) for a PDCCH indicating release of DL SPS (semi-persistent scheduling) or transmission of a PDSCH for which a corresponding PDCCH is detected, the terminal transmits an ACK/NACK once using a PUCCH resource derived from the CCE index of the corresponding PDCCH. Thereafter, the ACK/NACK is repeated transmitted ($N_{ANRep}-1$) times using the PUCCH resource, $n^{(1,p)}_{PUCCH}$, that is given through the higher layer signal.

When one serving cell is configured, the terminal may support two-antenna port transmission, and in such case, the ACK/NACK repetition may be conducted using PUCCH formats 1a/1b.

In the case of FDD (frequency division duplex), the terminal transmits an ACK/NACK in the subframe n for the PDSCH received in the subframe n−4. If the ACK/NACK repetition is configured, the terminal, for the PDSCH received in the subframe n−4, transmits an ACK/NACK on the PUCCH of the subframes n, n+1, . . . , n+$N_{ANRep}$−1. In this case, the ACK/NACK for the PDSCH received in the subframes n−3, . . . , n+$N_{ANRep}$−5 is not transmitted.

In the case of TDD (time division duplex), if the ACK/NACK repetition is configured, the terminal transmits the ACK/NACK in the uplink subframe n on the PDSCH received in the subframe(s) n−k. k is an element of K that is defined in the following table:

TABLE 5

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

K is determined according to the UL-DL configuration and subframe n and may consist of M elements like $\{k_0, k_1, \ldots, k_{M-1}\}$. For example, if the UL-DL configuration is 0, and n is 7, K is $\{6\}$.

If the terminal does not perform ACK/NACK repetition in the subframe n on the PDSCH received in a previous downlink subframe of the subframe n−k, the terminal transmits the ACK/NACK only for the PDSCH received in the subframe n−k, on the PUCCH of the uplink subframe n and its subsequent $N_{ANRep}-1$ uplink subframes. And, the terminal does not transmit the ACK/NACK for the PDSCH received in the subframe $n_i$−k. Here, k is an element of Ki that is defined corresponding to the subframe n, $(1 \leq i \leq N_{ANRep}-1)$ by Table 5 above. In TDD, the ACK/NACK repetition applies only to ACK/NACK bundling, but might not apply to ACK/NACK multiplexing.

In case the above-described ACK/NACK repetition applies, values a and b should be changed. That is, the time when the activation/deactivation of the serving cell applies with respect to the time when the terminal receives an activation/deactivation signal for the serving cell should be set to be different from the existing value.

Figure 11:
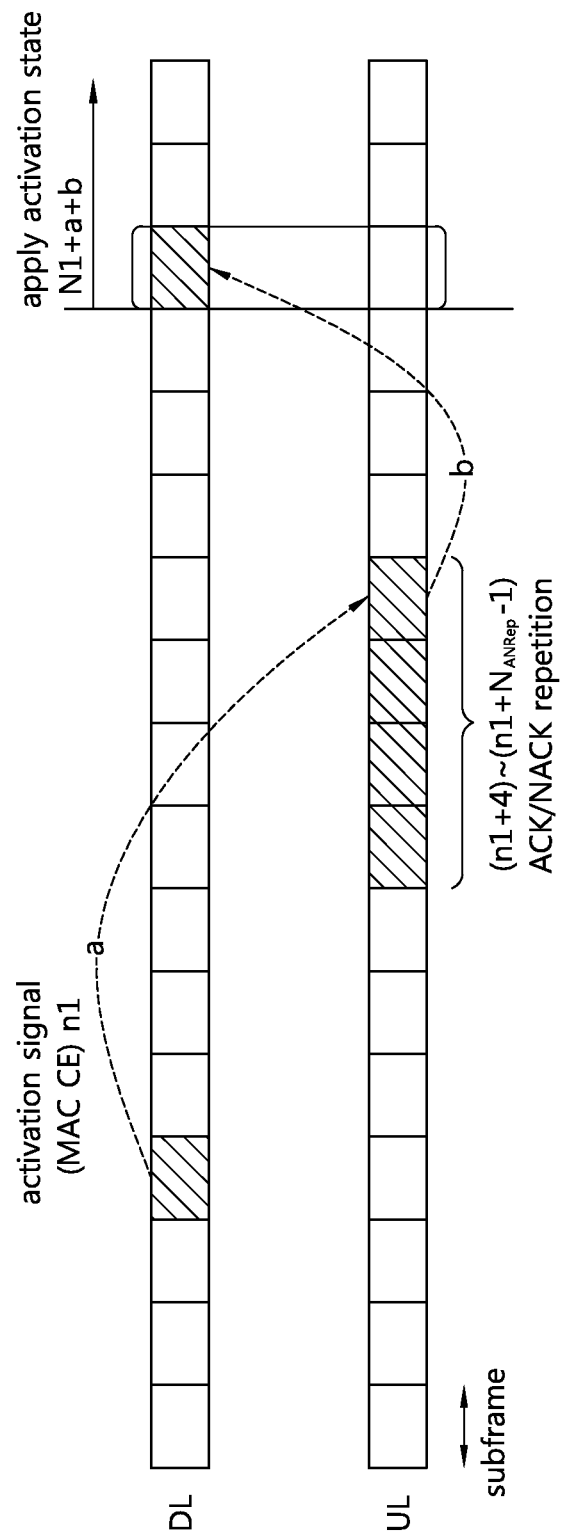
FIG. 11 shows timings of transmission and reception of activation/deactivation signals for a serving cell between a base station and a terminal and times when activation/deactivation of the serving cell applies in case ACK/NACK repetition is used in FDD.

FIG. 11 shows timings of transmission and reception of activation/deactivation signals for a serving cell between a base station and a terminal and times when activation/deactivation of the serving cell applies in case ACK/NACK repetition is used in FDD.

If in FDD ACK/NACK repetition is used, the number of UL subframes in which the ACK/NACK is transmitted is increased from 1 to $N_{ANRep}$. Accordingly, the time during which the ACK/NACK is transmitted is increased by the $(N_{ANRep}-1)$ subframes as compared with the existing one. Resultantly, a is changed to $4+(N_{ANRep}-1)=N_{ANRep}+3$. Accordingly, $x=a+b=N_{ANRep}+3+4=N_{ANRep}+7$.

Meanwhile, if a varies depending on $N_{ANRep}$, complexity increases. To avoid this, among the values set as $N_{ANRep}$ (for example, $N_{ANRep} \in \{2, 4, 6\}$), the maximum value (which is denoted as $\max(N_{ANRep,configurable})$) may be used to set a. In the above example, a is 6. In this case, i.e., $x=a+b=\max(N_{ANRep,configurable})+3+4=\max(N_{ANRep,configurable})+7=6+7=13$. This value may be used only when ACK/NACK repetition applies or irrespective of whether to use ACK/NACK repetition.

In the case of TDD, if ACK/NACK repetition does not apply, a may be set as an HARQ process timing value m(n) per DL subframe (a=m(n)) as in the following table, while b=4.

TABLE 6

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | 4 | 6 | | | 4 | 6 | | | | |
| 1 | 7 | 6 | | 4 | 7 | 6 | | | | 4 |
| 2 | 7 | 6 | 4 | 8 | 7 | 6 | | 4 | 8 | |
| 3 | 4 | 11 | | | 7 | 6 | 6 | 5 | 5 | |
| 4 | 12 | 11 | | 8 | 7 | 7 | 6 | 5 | 4 | |
| 5 | 12 | 11 | 9 | 8 | 7 | 6 | 5 | 4 | 13 | |
| 6 | 7 | 7 | | | 7 | 7 | | | | 5 |

In other words, in TDD, a is set as a value, m(n), given in Table 6 above for the DL subframe n, and b is set as 4.

Table 6 above may also be represented as in Table 7:

TABLE 7

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | — | 5 | — | — | 7 | — |

Table 7 above shows subframe gaps between UL subframes and DL subframes corresponding to ACKs/NACKs transmitted in the UL subframes. That is, Table 6 and Table 7 are equivalent to each other.

According to Tables 6 and 7, $x=a+b=m(n)+b=m(n)+4$. That is, in the case of TDD in which the ACK/NACK repetition does not apply, an activation timing of a specific serving cell may be defined by Tables 6 and 7 above.

If in TDD, ACK/NACK repetition is used, the number of UL subframes in which the ACK/NACK is transmitted is increased from 1 to $N_{ANRep}$. Accordingly, a should be determined additionally considering $N_{ANRep}-1$ UL subframes (at this time, the $N_{ANRep}-1$ UL subframes might not be consecutive unlike in FDD). In other words, the number of subframes required from the subframe n to the 'subframe in which transmission of the $N_{ANRep}$=UL subframes from m(n) including m(n) itself' is set as a. Or, a sum of m(n) and the 'number of subframes required from m(n) excluding m(n) itself to when transmission of the $N_{ANRep}$ UL subframes is terminated' may be set as a.

For example, assume that $N_{ANRep}=4$, the base station transmits an activation/deactivation signal on a PDSCH in the subframe 1 (n=1) of UL-DL configuration 1, and the terminal receives the signal without errors. Referring to Table 6, for UL-DL configuration 1 and subframe 1, m(1)=6. Accordingly, the ACK/NACK for the activation/deactivation signal received in subframe 1 starts to be transmitted in the subframe corresponding to n=7, and ends up being transmitted through a total of four UL subframes. For example, the ACK/NACK is repeatedly transmitted through subframes 7, 8, and 9 of frame #N and subframe 2 of frame #N+1. Without the ACK/NACK repetition, a would be 6 whereas with the ACK/NACK repetition, a would be 12. Thus, x=12+4=16.

As such, for $N_{ANRep}=\{2, 4, 6\}$, a per DL subframe may be obtained for each UL-DL configuration, resulting in the following table.

TABLE 8

| UL-DL Configuration | 0 | 1 | 2 | 3 | 4 | 5 | 6 | 7 | 8 | 9 | Max |
|---|---|---|---|---|---|---|---|---|---|---|---|
| 0 | 4 + 3 | 6 + 1 |  | — |  | 4 + 3 | 6 + 1 |  | — |  | 7 |
| 1 | 7 + 1 | 6 + 1 |  |  | 4 + 4 | 7 + 1 | 6 + 1 |  |  | 4 + 4 | 8 |
| 2 | 7 + 5 | 6 + 5 |  | 4 + 5 | 8 + 5 | 7 + 5 | 6 + 5 |  | 4 + 5 | 8 + 5 | 13 |
| 3 | 4 + 8 | 11 + 1 |  |  |  | 7 + 1 | 6 + 1 | 6 + 1 | 5 + 1 | 5 + 8 | 13 |
| 4 | 12 + 1 | 11 + 1 |  |  | 8 + 1 | 7 + 1 | 7 + 9 | 6 + 9 | 5 + 9 | 4 + 9 | 16 |
| 5 | 12 + 10 | 11 + 10 |  | 9 + 10 | 8 + 10 | 7 + 10 | 6 + 10 | 5 + 10 | 4 + 10 | 13 + 10 | 23 |
| 6 | 7 + 1 | 7 + 4 |  |  |  | 7 + 1 | 7 + 1 |  |  | 5 + 3 | 11 |

Table 8 above represents a's in case $N_{ANRep}=2$.

TABLE 9

| UL-DL Configuration | 0 | 1 | 2 | 3 | 4 | 5 | 6 | 7 | 8 | 9 | Max |
|---|---|---|---|---|---|---|---|---|---|---|---|
| 0 | 4 + 5 | 6 + 5 |  | — |  | 4 + 5 | 6 + 5 |  | — |  | 11 |
| 1 | 7 + 6 | 6 + 6 |  |  | 4 + 9 | 7 + 6 | 6 + 6 |  |  | 4 + 9 | 13 |
| 2 | 7 + 15 | 6 + 15 |  | 4 + 15 | 8 + 15 | 7 + 15 | 6 + 15 |  | 4 + 15 | 8 + 15 | 23 |
| 3 | 4 + 10 | 11 + 10 |  |  |  | 7 + 10 | 6 + 10 | 6 + 10 | 5 + 10 | 5 + 10 | 21 |
| 4 | 12 + 11 | 11 + 11 |  |  | 8 + 11 | 7 + 11 | 7 + 19 | 6 + 19 | 5 + 19 | 4 + 19 | 26 |
| 5 | 12 + 30 | 11 + 30 |  | 9 + 30 | 8 + 30 | 7 + 30 | 6 + 30 | 5 + 30 | 4 + 30 | 13 + 30 | 43 |
| 6 | 7 + 6 | 7 + 6 |  |  |  | 7 + 5 | 7 + 5 |  |  | 5 + 8 | 13 |

Table 9 above represents a's in case $N_{ANRep}=4$.

TABLE 10

| UL-DL Configuration | 0 | 1 | 2 | 3 | 4 | 5 | 6 | 7 | 8 | 9 | Max |
|---|---|---|---|---|---|---|---|---|---|---|---|
| 0 | 4 + 9 | 6 + 9 |  | — |  | 4 + 9 | 6 + 9 |  | — |  | 15 |
| 1 | 7 + 11 | 6 + 11 |  |  | 4 + 14 | 7 + 11 | 6 + 11 |  |  | 4 + 14 | 18 |
| 2 | 7 + 25 | 6 + 25 |  | 4 + 25 | 8 + 25 | 7 + 25 | 6 + 25 |  | 4 + 25 | 8 + 25 | 33 |
| 3 | 4 + 19 | 11 + 12 |  |  |  | 7 + 12 | 6 + 12 | 6 + 19 | 5 + 19 | 5 + 19 | 25 |
| 4 | 12 + 21 | 11 + 21 |  |  | 8 + 21 | 7 + 21 | 7 + 29 | 6 + 29 | 5 + 29 | 4 + 29 | 35 |
| 5 | 12 + 50 | 11 + 50 |  | 9 + 50 | 8 + 50 | 7 + 50 | 6 + 50 | 5 + 50 | 4 + 50 | 13 + 50 | 63 |
| 6 | 7 + 10 | 7 + 10 |  |  |  | 7 + 10 | 7 + 10 |  |  | 5 + 10 | 17 |

Table 10 above represents a's in case $N_{ANRep}=6$.

As in Tables 8 to 10 above, a may apply per $N_{ANRep}$, per UL-DL configuration, and per DL subframe. However, such scheme may lead to increased complexity as a varies per subframe.

To address such issue, according to the present invention, for each UL-DL configuration in Tables 8 to 10 above, the 'maximum value among a's per subframe in the UL-DL configurations' may be used. For example, in the case of $N_{ANRep}=4$ and UL-DL configuration 1, referring to Table 9, a's per subframe are given {7+6, 6+6, 4+9, 7+6, 6+6, 4+9}. In this case, the maximum value, 13, may be used as a. Further, in the case of UL-DL configuration 2, the maximum value, 23, may be used as a.

That is, in case ACK/NACK repetition is set so that the ACK/NACK for activation information for a specific serving cell is repeatedly transmitted in the same number of uplink subframes as parameter $N_{ANRep}$, assuming that the subframe in which the terminal receives the activation information is subframe n, the subframe in which the activation or deactivation state applies to the specific serving cell is given subframe n+a+4, where a may be the maximum value of the values given by the number of subframes from the subframe n to the $N_{ANRep}$ uplink subframes including the subframe n+m(n) for each UL-DL configuration of the specific serving cell.

Or, in order to reduce complexity that renders a to vary depending on each UL-DL configuration, the largest one of the 'maximum values of a's per subframe in the UL-DL configurations' of all possible UL-DL configurations may be considered to be used as a for all of the UL-DL configurations.

For example, in case $N_{ANRep}=4$, the 'maximum values of a's per subframe in the UL-DL configurations' in Table 9 above are given {11, 13, 23, 21, 26, 43, 13}. In this case, the largest maximum value, 43, is used as a for all of the UL-DL configurations.

In other words, the maximum value of values given by the number of subframes from the subframe (which is assumed as subframe n) in which an activation signal is received to the $N_{ANRep}$ uplink subframes including the subframe n+m(n) among all of the UL-DL configurations that may apply to a specific serving cell is used as a.

Meanwhile, a review of UL-DL configuration 0 in Table 7 shows that a UL subframe exists which does not correspond to a DL subframe (for example, n=3, 8). In the above-described method, upon transmission of the ACK/NACK in the $N_{ANRep}$ Nth subframes, a timing may be set in such a way that the UL subframe not corresponding to a DL subframe is skipped and transmission is done in a subsequent UL subframe.

Figure 12:
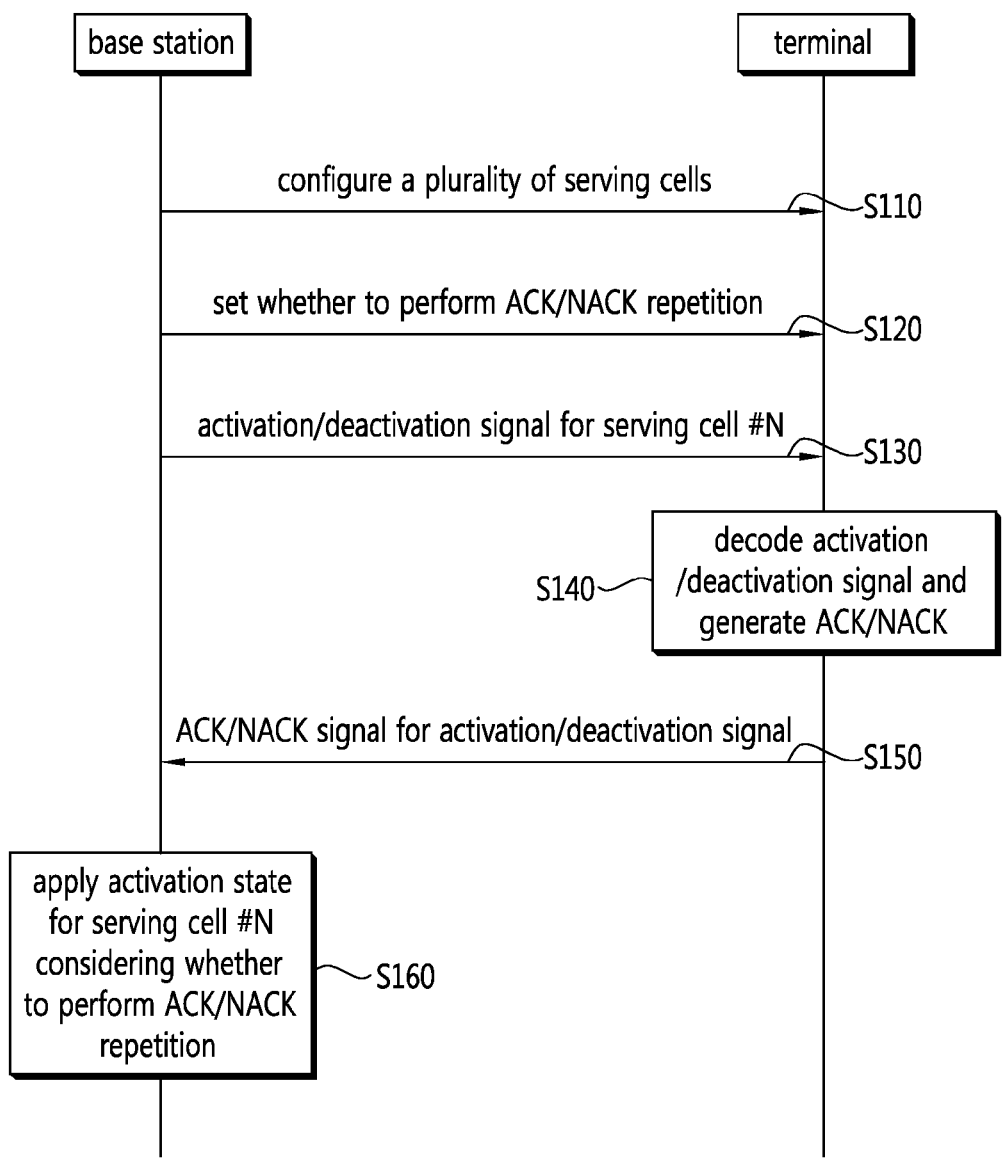
FIG. 12 shows a method of applying control information according to an embodiment of the present invention.

FIG. 12 shows a method of applying control information according to an embodiment of the present invention.

Referring to FIG. 12, the base station configures a plurality of serving cells (S110). A signal for configuring the plurality of serving cells may be transmitted through a higher layer signal such as an RRC. For example, the base station may configure serving cell #M and serving cell #N. Serving cell #M is a primary cell, and serving cell #N may be a secondary cell.

The base station sets up whether to perform ACK/NACK repetition (S120). The ACK/NACK repetition has been described above in detail.

The base station transmits an activation/deactivation signal for serving cell #N (S130). For example, the base station may transmit an activation/deactivation signal for serving cell #N through a DL PCC of serving cell #M. The activation/deactivation signal for serving cell #N is an example of control information given as a higher layer signal such as an RRC message or an MAC message.

The terminal decodes the activation/deactivation signal and generates an ACK/NACK (S140).

The terminal transmits the ACK/NACK for the activation/deactivation signal (S150). For example, the terminal may transmit the ACK/NACK through a UL PCC. The terminal may transmit the ACK/NACK only in one uplink subframe or repeatedly transmit the ACK/NACK in a plurality of uplink subframes depending on whether the ACK/NACK repetition is performed.

When receiving the ACK/NACK, the base station activates serving cell #N considering whether to perform the ACK/NACK repetition (S160). That is, the terminal may be aware of which subframe serving cell #N is activated in accordance with whether the ACK/NACK repetition is performed. Generally speaking, the base station and the terminal determine a time when specific control information applies in consideration of whether to perform the ACK/NACK repetition.

Regarding the time when the above-described activation/deactivation of the serving cell applies, the terminal may apply activation/deactivation from a time determined according to the present invention or before the determined time.

Or, the terminal may render a time when the activation of the serving cell applies different from a time when the deactivation of the serving cell applies. For example, the activation of the serving cell may be performed from a time determined according to the present invention, and the deactivation of the serving cell may be performed before the time determined according to the present invention.

As described above, the present invention may apply to a time when other control information signals apply which are transmitted through an RRC or MAC signaling, as well as to activation/deactivation of serving cells.

For example, the present invention may be also adopted for a time when a single RM/dual RM is selected upon joint coding in multiplexing of an ACK/NACK and CSI, the number of ACK/NACK coding bits upon separate coding in multiplexing an ACK/NACK and CSI, a time when the number of CSI coding bits applies, a time when the number of ACK/NACK payloads applies according to a configuration of a secondary cell, and a time when a reference UL-DL configuration of a secondary cell applies upon aggregation between different TDD UL-DL configurations.

For example, in case the number of bits input into an RM encoder due to the restriction in the base sequence and the RM code defined in PUCCH format 3 is 11 or less, one RM code is used. In contrast, in case the number of bits input into the RM encoder exceeds 11, two RM codes are used, enabling a maximum of 22 input bits to be processed.

In case an ACK/NACK and CSI are multiplexed and transmitted through PUCCH format 3, the number of ACK/NACK bits configures a bit field, fitting into a configured serving cell. In contrast, the number of CSI bits is configured based on an activated serving cell. Accordingly, if an error occurs in activation/deactivation of a specific cell, the terminal recognizes the number of bits of the ACK/NACK+CSI as being more than 11, two RM codes are used to perform channel coding, and the base station recognizes the number of the ACK/NACK+CSI bits as being 11 or less, and the base station may perform decoding, assuming that one RM code has been used to perform channel coding.

The number of encoding bits and resource element mapping applied when one RM code is used are different from those applied when two RM codes are used, so that a problem may happen in decoding ACK/NACK bits as well as CSI.

The present invention may be also used for determining a time when selection between a single RM/dual RM applies upon joint coding in multiplexing an ACK/NACK and CSI.

Figure 13:
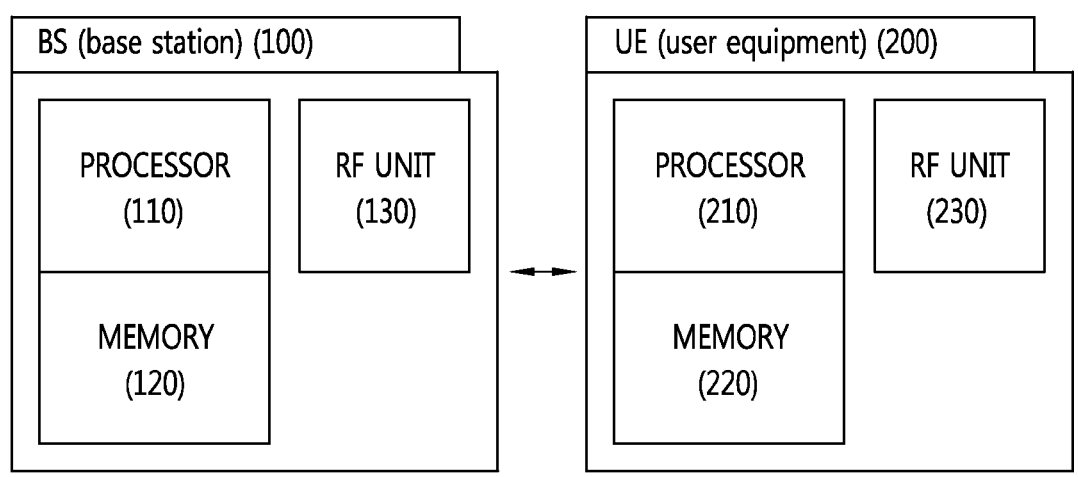
FIG. 13 is a block diagram illustrating a base station and a terminal for implementing an embodiment of the present invention.

FIG. 13 is a block diagram illustrating a base station and a terminal for implementing an embodiment of the present invention.

The base station 100 includes a processor 110, a memory 120, and an RF (Radio Frequency) unit 130. The processor 110 implements a function, procedure, and/or method as suggested herein. The processor 110 sets whether to perform ACK/NACK repetition for the terminal and transmits control information through a higher layer signal. In case ACK/NACK repetition is set, a time when an operation by the control information applies is determined considering that an ACK/NACK is transmitted from the terminal in a plurality of subframes. The layers of a radio interface protocol may be implemented by the processor 110. The memory 120 is connected to the processor 110 and stores various types of information for driving the processor 110. The RF unit 130 is connected to the processor 110 and transmits and/or receives a radio signal.

The terminal 200 includes a processor 210, a memory 220, and an RF unit 230. The processor 210 implements a function, procedure, and/or method as suggested herein. The processor 210 receives a setting as to whether to perform ACK/NACK repetition from the base station and receives control information that applies from a specific time from the base station. The control information may be received through a PDSCH and may be an RRC message or an MAC message. Further, the processor 210 transmits an ACK/NACK for control information, and in case the transmitted ACK/NACK is an ACK, performs an operation according to the control information from a specific time. At this time, the operation performed from the specific time applies from a subframe that is determined depending on whether the ACK/NACK repetition is set. As examples of such an operation, reception of an activation/deactivation signal in a carrier aggregation system, transmission of an ACK/NACK for the activation/deactivation signal, and application of an activation/deactivation state to a serving cell have been described above. As set forth in detail above, the present invention is not limited thereto, and may be applicable to both control information of a higher layer applied from a specific time and a time when an operation according to the control information applies. The layers of a radio interface protocol may be implemented by the processor 210. The memory 220 is connected to the processor 210 and stores various types of information for driving the processor 210. The RF unit 230 is connected to the processor 210 and transmits and/or receives a radio signal.

The processor 110 or 210 may include an ASIC (application-specific integrated circuit), other chipsets, a logic circuit and/or a data processing device. The memory 120 or 220 may include an ROM (read-only memory), an RAM (random access memory), a flash memory, a memory card, a storage medium and/or other storage devices. The RF unit 130 or 230 may include a baseband circuit for processing a radio signal. When an embodiment is embodied in software, the above-described schemes may be realized in modules (procedures or functions) for performing the above-described functions. The modules may be stored in the memory 120 or 220 and may be executed by the processor 110 or 210. The memory 120 or 220 may be positioned in or outside the processor 110 or 210 and may be connected to the processor 110 or 210 via various well-known means. In the above-exemplified system, the methods have been described based on the flowchart having a series of steps or blocks, but the present invention is not limited to the order of the steps. Some steps may be performed simultaneously or in a different order of other steps. It will be understood by those of ordinary skill in the art that the steps in the flowchart are not exclusive and other steps may be added or some of the steps of the flowchart may be deleted without affecting the scope of the present invention.

Although embodiments of the present invention have been described, it will be understood by those of ordinary skill various changes or modifications may be made thereto without departing from the scope of the present invention as defined by the appended claims.

What is claimed is:

1. A method of applying control information of a terminal in a wireless communication system, the method comprising:
   receiving a setting as to whether ACK/NACK (acknowledgement/not-acknowledgement) repetition is performed from a base station;
   receiving control information that is applied from a specific time from the base station;
   transmitting an ACK/NACK for the control information; and
   performing an operation according to the control information from the specific time in a case where the transmitted ACK/NACK is an ACK,
   wherein the operation performed from the specific time is determined depending on whether the ACK/NACK repetition is set,
   wherein a serving cell in which the terminal operates is a serving cell that operates in TDD (time division duplex), and
   wherein in a case where the ACK/NACK repetition is not set, when a downlink subframe for receiving the control information is a subframe n, and an uplink subframe in which the ACK/NACK for the control information is transmitted is a subframe n+m(n), a subframe in which the operation according to the control information is performed begins from a subframe n+m(n)+4, wherein m(n) is given as in the following table according to a UL-DL configuration of the serving cell in which the terminal operates and the subframe n;

| UL-DL configuration | subframe n | | | | | | | | | |
|---|---|---|---|---|---|---|---|---|---|---|
| | 0 | 1 | 2 | 3 | 4 | 5 | 6 | 7 | 8 | 9 |
| 0 | 4 | 6 | — | | 4 | 6 | | | — | |
| 1 | 7 | 6 | | 4 | 7 | 6 | | | | 4 |
| 2 | 7 | 6 | 4 | 8 | 7 | 6 | | 4 | | 8 |
| 3 | 4 | 11 | | | 7 | 6 | 6 | 5 | | 5 |
| 4 | 12 | 11 | | 8 | 7 | 7 | 6 | 5 | | 4 |
| 5 | 12 | 11 | 9 | 8 | 7 | 6 | 5 | 4 | | 13 |
| 6 | 7 | 7 | | | 7 | 7 | | | | 5 |

2. The method of claim 1, wherein the control information is included in a higher layer signal received through a PDSCH (physical downlink shared channel).

3. The method of claim 1, wherein in a case where the ACK/NACK repetition is set, the ACK/NACK for the control information is repeatedly transmitted in subframes whose number is indicated by a parameter ($N_{ANRep}$) configured by a higher layer signal by the parameter.

4. The method of claim 3, wherein when a subframe in which the control information is received is a subframe n, and a maximum value of values that may be possessed by the parameter ($N_{ANRep}$) is max ($N_{ANRep,configurable}$), a subframe in which the operation according to the control information is performed begins from a subframe (n+max ($N_{ANRep,configurable}$)+7).

5. The method of claim 4, wherein a serving cell in which the terminal operates is a serving cell that operates in FDD (frequency division duplex).

6. The method of claim 1, wherein in a case where the ACK/NACK repetition is set so that the ACK/NACK for the control information is repeatedly transmitted in uplink subframes whose number is the same as a parameter $N_{ANRep}$ configured by a higher layer signal, when a subframe for receiving the control information is a subframe n, a subframe in which the operation according to the control information is a subframe n+a+4, wherein a is a maximum value of values given as the number of subframes from the subframe n to $N_{ANRep}$ uplink subframes including the subframe n+m(n) in a UL-DL configuration of a serving cell in which the terminal operates.

7. The method of claim 1, wherein in a case where the ACK/NACK repetition is set so that the ACK/NACK for the control information is repeatedly transmitted in $N_{ANRep}$ uplink subframes, where $N_{ANRep}$ is a parameter configured by a higher layer signal, if a subframe for receiving the control information is a subframe n, a subframe in which an operation according to the control information is performed is given as a subframe n+a+4, wherein a is a maximum value of values given as the number of subframes from the subframe n to $N_{ANRep}$ uplink subframes including the subframe n+m(n) in a UL-DL configuration of a serving cell in which the terminal operates.

8. A terminal comprising:
   an RF (Radio Frequency) unit transmitting and receiving a radio signal; and
   a processor connected to the RF unit, wherein the processor receives a setting as to whether to perform ACK/NACK (acknowledgement/not-acknowledgement) repetition from a base station, receives control information that is applied from a specific time from the base station, transmits an ACK/NACK for the control information, and in a case where the transmitted ACK/NACK is an ACK, performs an operation according to the control information from the specific time, wherein the operation performed from the specific time applies from a subframe determined depending on whether the ACK/NACK repetition is set,
   wherein a serving cell in which the terminal operates is a serving cell that operates in TDD (time division duplex), and
   wherein in a case where the ACK/NACK repetition is not set, when a downlink subframe for receiving the control information is a subframe n, and an uplink subframe in which the ACK/NACK for the control information is transmitted is a subframe n+m(n), a subframe in which the operation according to the control information is performed begins from a subframe n+m(n)+4, wherein m(n) is given as in the following table according to a UL-DL configuration of the serving cell in which the terminal operates and the subframe n;

| UL-DL configuration | subframe n | | | | | | | | | |
|---|---|---|---|---|---|---|---|---|---|---|
| | 0 | 1 | 2 | 3 | 4 | 5 | 6 | 7 | 8 | 9 |
| 0 | 4 | 6 | — | | 4 | 6 | | — | | |
| 1 | 7 | 6 | | | 4 | 7 | 6 | | | 4 |
| 2 | 7 | 6 | | 4 | 8 | 7 | 6 | | 4 | 8 |
| 3 | 4 | 11 | | | | 7 | 6 | 6 | 5 | 5 |
| 4 | 12 | 11 | | | 8 | 7 | 7 | 6 | 5 | 4 |
| 5 | 12 | 11 | | 9 | 8 | 7 | 6 | 5 | 4 | 13 |
| 6 | 7 | 7 | | | | 7 | 7 | | | 5. |

9. The terminal of claim 8, wherein the control information is included in a higher layer signal received through a PDSCH (physical downlink shared channel).

10. The terminal of claim 8, wherein in a case where the ACK/NACK repetition is set, the ACK/NACK for the control information is repeatedly transmitted in subframes whose number is indicated by a parameter ($N_{ANRep}$) configured by a higher layer signal by the parameter.

11. The terminal of claim 10, wherein when a subframe in which the control information is received is a subframe n, and a maximum value of values that may be possessed by the parameter ($N_{ANRep}$) is max ($N_{ANRep,configurable}$), a subframe in which the operation according to the control information is performed begins from a subframe (n+max ($N_{ANRep,configurable}$)+7).

12. The terminal of claim 11, wherein a serving cell in which the terminal operates is a serving cell that operates in FDD (frequency division duplex).

13. The terminal of claim 8, wherein in a case where the ACK/NACK repetition is set so that the ACK/NACK for the control information is repeatedly transmitted in uplink subframes whose number is the same as a parameter $N_{ANRep}$ configured by a higher layer signal, when a subframe for receiving the control information is a subframe n, a subframe in which the operation according to the control information is a subframe n+a+4, wherein a is a maximum value of values given as the number of subframes from the subframe n to $N_{ANRep}$ uplink subframes including the subframe n+m(n) in a UL-DL configuration of a serving cell in which the terminal operates.

14. The terminal of claim 8, wherein in a case where the ACK/NACK repetition is set so that the ACK/NACK for the control information is repeatedly transmitted in $N_{ANRep}$ uplink subframes, where $N_{ANRep}$ is a parameter configured by a higher layer signal, if a subframe for receiving the control information is a subframe n, a subframe in which an operation according to the control information is performed is given as a subframe n+a+4, wherein a is a maximum value of values given as the number of subframes from the subframe n to $N_{ANRep}$ uplink subframes including the subframe n+m(n) in a UL-DL configuration of a serving cell in which the terminal operates.

* * * * *